Patented Oct. 14, 1952

2,614,072

UNITED STATES PATENT OFFICE 2,614,072

SEPARATION OF MIXTURES CONTAINING ALCOHOLS, ALDEHYDES, AND KETONES

Carl S. Carlson, Elizabeth, and Paul V. Smith, Jr., Westfield, N. J., assignors to Standard Oil Development Company, a corporation of Delaware No Drawing. Application December 19, 1947, Serial No. 792,860

5 Claims. (Cl. 202—57)

This invention relates to a practical method of separating wide-boiling mixtures of organic oxygenated compounds, and is concerned with a method of preventing certain of the oxygenated compounds from exerting a deleterious effect on the other oxygenated compounds of the mixture during their separation by distillation. In particular, this invention is concerned with a method of repressing the action of carbonyl compounds, e. g. aldehydes and ketones, upon other oxygenated compounds, e. g. alcohols, carboxylic acids and esters while the mixture of such oxygenated compounds is being separated by fractional distillation.

Wide-boiling mixtures of oxygenated organic compounds may be obtained, for example, by the Fischer synthesis, in which carbon oxides are reacted with hydrogen to produce a mixture of hydrocarbons and oxygenated organic compounds, substantially aliphatic, which when condensed separate into an oil layer and a water layer, both of which contain various oxygenated compounds both branched and straight-chain including aldehydes, ketones, ethers, acetals, esters, carboxylic acids and alcohols. Another source of such a mixture of oxygenated compounds is the oxidation of hydrocarbons where again both oil and water layers are obtained as products each containing organic oxygenated compounds.

A typical example of the composition of a water layer resulting from the Fischer synthesis is as follows:

| | Weight per cent |
|---|---|
| Water | 90 |
| Alcohols (chiefly $C_1$–$C_4$ and some higher) | 3.7 |
| Aldehydes ($C_2$–$C_5$) | 1.0 |
| Ketones ($C_3$–$C_5$) | 0.6 |
| Esters | 0.1 |
| Acids | 4.5 |
| Ethers | Trace |
| Hydrocarbons | Trace |

This water layer is fractionated into a number of cuts all boiling below approximately 100° C. One such cut, called an aqueous crude ethanol cut, boiling within the range of approximately 60° C. to approximately 85° C. at atmospheric pressure contains the following:

| Compound | Anhydrous B. P., ° C. |
|---|---|
| Acetone | 56.5 |
| Methyl Alcohol | 64.7 |
| n-butyraldehyde | 75.7 |
| Ethyl Acetate | 77.1 |
| Ethyl Alcohol | 78.5 |
| Methyl ethyl ketone | 79.6 |
| Isopropyl Alcohol | 82.3 |
| t-butyl alcohol | 82.8 |
| n-propanol | 97.2 |
| Water | 100.0 |
| Methyl propyl ketone | 101.7 |
| Acetal | 103.2 |

Such a cut contains about 70–75 weight per cent ethyl alcohol; 5–9 weight per cent aldehydes; 10–15 weight per cent ketones; the balance comprising other alcohols, esters, acetals, hydrocarbons and water.

Since the alcohols, ketones, aldehydes, etc., present in such a mixture, realize their greatest commercial and economic value in their purified and anhydrous form, it is desirable to separate and recover the components of the mixture free from contaminating amounts of each other and free of water to the greatest possible extent.

The separation of such a complex mixture is difficult to accomplish and cannot be done by ordinary fractional distillation because of the fact that many of the components boil within a narrow range. Furthermore, many of the components of such a mixture during distillation, form binary azeotropes with water and often with each other, or ternary azeotropes with water and/or each other. In addition, during the fractional distillation considerable amounts of desirable components are lost through reaction with each other. For example, the alcohols react with ketones and aldehydes forming respectively less desirable ketals and acetals. Ketal and acetal formation is enhanced by the presence of small amounts of acid which catalyzes the reaction, and also by the presence of anhydrous conditions.

It is therefore an object of this invention to provide a commercially feasible process for the efficient separation of mixtures of oxygenated organic compounds which are difficult to effectively separate by ordinary fractional distillation methods.

This and other objects of this invention are accomplished by repressing the deleterious action of aldehydes and ketones in the mixture on the other oxygenated components of the mixture.

The original mixture, e. g. a crude "ethanol cut" has a pH of about 4.0. When such a mixture is distilled, the aldehydes present combine readily with the alcohols to form acetals which are higher boiling products. The yields of desirable alcohols are thus reduced. In addition, it has been found that aldehydes present in such mixtures as the ethanol cut described, form azeotropes interfering with the effective separation of the oxygenated compounds. For example, ethyl alcohol forms a binary azeotrope with normal butyraldehyde. The boiling point of this azeotrope is approximately 68° C. A ternary azeotrope of ethyl alcohol-n-butyraldehyde-water has also been found and this azeotrope boils at 67.2° C. approximately. Isovaleraldehyde forms a binary azeotrope with water, boiling point 70° C. approximately; and paraldehyde likewise forms a binary azeotrope with water, boiling point 90.4° C. approximately. In addition, a binary azeotrope, boiling point 99.5° C., has been found between crotonaldehyde and methyl propyl ketone.

It is evident therefore, that aldehydes interfere with the effective separation of oxygenated organic compounds because of their tendencies (1) to form azeotropes whose boiling points are close to those of pure compounds whose separation and recovery are desired, and (2) to undergo chemical reaction with desirable oxygenated compounds, e. g. the alcohols, forming less desirable reaction products, e. g. acetals, etc.

It has now been found that the unfavorable action of aldehydes during the fractional distillation of mixtures of oxygenated compounds can be repressed by treating the mixture with an alkali or other neutralizing agents capable of bringing the pH of the mixture to the basic side, and maintaining the pH on the basic side during the distillation process. When such conditions are maintained the aldehydes are converted to aldolization products which are higher-boiling and can be separated as such, or treated for aldehyde recovery therefrom if desired.

Acetal and ketal formation is thus suppressed and the deleterious azeotrope formation is avoided, thus allowing the fractional distillation to proceed more smoothly and effectively without loss of desirable product, particularly the alcohols.

Reagents capable of producing the necessary pH on the basic side, i. e. a pH greater than 7.0, are the usual inorganic and organic bases such as alkalis and amines, ammonia, basic salts etc. Extremely suitable are sodium and potassium hydroxides and carbonates, other water-soluble hydroxides, the water-soluble amines, etc.

It has been found that any pH on the basic side from above 7.0 to 14 effectively maintained during the distillation of the oxygenated compounds will suppress the unfavorable action of the aldehydes and ketones. It is not necessary that the pH be maintained at one fixed point, e. g. 8.5 or 8.6 during the entire distillation. The pH may vary over a narrow or a wide range, but it is essential that the pH in the distillation zone not be allowed to fall below the basicity range, i. e. below about 7.1 during the distillation. When the mixture of organic oxygenated compounds contains an extremely large amount of ketones, it has been found desirable not to allow the pH to rise above 10.5–11.0. At pH values above this figure it has been found that the ketones begin to undergo aldol condensation which is undesirable and which reduces the yield of recoverable ketones.

The following examples illustrate one method of carrying out the invention. It is not intended, however, that the invention be limited thereto.

EXAMPLE I

An over-all sample of a mixture of oxygenated compounds having an aqueous boiling range of approximately 15° C.–100° C. and containing alcohols, ketones, acid, water, esters and about 8 to 9% aldehydes obtained from the distillation of the water layer resulting from a Fischer synthesis run was treated with alkali (NaOH) to a pH of 14 and then fractionated. All of the aldehydes were separated as the high-boiling aldol condensation product.

EXAMPLE II

A "crude alcohol" mixture obtained from the distillation of the water layer resulting from a hydrocarbon synthesis run was treated with alkali (NaOH) until it attained a pH of 8.0 to 8.5 and was thereafter distilled, the pH being maintained at 8.0 to 8.5 during the distillation. Three aqueous cuts obtained during the distillation and designated a methanol-acetone cut, an ethanol cut and a n-propanol cut respectively, were analyzed for composition and compared with similar cuts obtained while distilling at a pH of 4.0 a crude alcohol mixture of substantially the same initial composition. The results of the analyses are tabulated as follows:

|  | Methanol-Acetone Cut | | Ethanol Cut | | N-Propanol Cut | |
| --- | --- | --- | --- | --- | --- | --- |
| Boiling range of cuts, °C.[1] | 0–68 | 0–69 | 68–82 | 69–81 | 82–90 | 81–90 |
| pH during distillation | 4.0 | 8–8.5 | 4.0 | 8–8.5 | 4.0 | 8–8.5 |
| Alcohols_____Centi-equivalents/g | 0.131 | 0.105 | 1.680 | 1.664 | 1.312 | 1.425 |
| Aldehydes_____do | 0.722 | 0.040 | 0.114 | 0.015 | 0.152 | 0.042 |
| Ketones_____do | 0.537 | 1.380 | 0.087 | 0.114 | 0.034 | 0.010 |
| Esters_____do | 0.099 | 0.018 | 0.130 | 0.032 | 0.189 | 0.000 |
| Acids_____do | 0.030 | 0.00 | 0.00 | 0.00 | 0.01 | 0.00 |
| Acetals_____do | 0.000 | 0.00 | 0.022 | 0.00 | 0.002 | 0.000 |

[1] When distilled from aqueous solutions.

The figures in the above analyses represent the composition of the distillation vapors in centi-equivalents per gram obtained as overhead in the distillation ranges mentioned. The aldehydes, of course, having been aldolized by the caustic were converted to high-boiling products which remained as a distillation residue. Thus, in the first two columns of the table, it is shown that the aldehyde content of the vapors present in a 0–68° C. cut when distilled at a pH of 8–8.5, has been reduced from 0.722 centi-equivalents per gram to 0.040 centi-equivalents per grams. Similar reductions are observed for the other cuts.

The data also indicate in addition to the substantial removal of aldehydes, a marked reduction of the ester content due to saponification, and of the acid content due to neutralization. Acetals and ketals are completely absent from the overhead from the distillation in the presence of caustic.

EXAMPLE III

Similar data were obtained on the analyses of a crude "butanol cut" obtained by fractional distillation of the water layer obtained from a Fischer synthesis run and are set out as follows:

N-butanol cut

| Boiling Range, °C.[1] | 91–95 | 90–93 | 90–93 |
|---|---|---|---|
| pH during distillation | 4.0 | 7.0 | 14 |
| Alcohols........centi-equivalents/g.. | 0.972 | 1.040 | 1.210 |
| Aldehydes................do.... | 0.060 | 0.049 | 0.015 |
| Ketones..................do.... | 0.052 | 0.044 | 0.038 |
| Esters...................do.... | 1.062 | 0.0978 | 0.0000 |
| Acids....................do.... | 0.0405 | 0.00 | 0.0009 |

[1] When distilled from aqueous solutions.

EXAMPLE IV

The same analyses was extended to a crude "pentanol cut" obtained by fractional distillation of the water layer obtained from a Fischer synthesis run and the data obtained are as follows:

N-pentanol cut

| Boiling Range, °C.[1] | 96–97 | 95–98 |
|---|---|---|
| pH during distillation | 4.0 | 14 |
| Alcohols........centi-equivalents/g.. | 0.900 | 1.067 |
| Aldehydes................do.... | 0.038 | 0.010 |
| Ketones..................do.... | 0.034 | 0.032 |
| Esters...................do.... | 0.1150 | 0.00375 |
| Acids....................do.... | 0.00214 | 0.0168 |

[1] When distilled from aqueous solutions.

In the tables listed above the boiling range of the material distilled has been expressed in terms of an aqueous boiling range, i. e. the boiling range of the cut when distilled from aqueous solution. For purposes of clarity the following table lists approximately the anhydrous and aqueous boiling range of the various cuts referred to.

| Crude Cut | Boiling Range, °C. | |
|---|---|---|
|  | Anhydrous | Aqueous |
| Methanol-Acetone Cut | 0–80 | 0–69 |
| Ethanol Cut | 60–110 | 69–81 |
| n-Propanol Cut | 75–120 | 81–90 |
| n-Butanol Cut | 97–140 | 90–95 |
| n-Pentanol Cut | 110–150 | 95–98 |

Many variations of the actual application of the invention are possible and can be used to remove reactive carbonyl compounds; such as aldehydes by converting them into materials of different molecular weight and boiling range, and preventing ketones from entering into ketal formation with the alcohols present. It is not intended to limit this invention to any particular mixture of organic oxygenated compounds nor to any particular sequence of operation given in the examples.

One successful sequence of steps employed for the use of this invention in the treatment of a Fischer synthesis water layer boiling in the range of 15–100° C. approximately is as follows:

1. Distillation of the acetaldehyde from the total overhead obtained by fractionation of the water layer.
2. Treat the remaining overhead material with alkali (to pH on basic side) thereby aldolizing the propionaldehyde and higher aldehydes.
3. Separate remaining alcohols and ketones by distillation up to 96 or 97° C.
4. Steam distillation or vacuum distillation of aldol products in residue, or separation as by decantation.

The invention is not to be limited to any manner in which the caustic or other agent is added. The main point is that throughout the distillation the pH should be maintained on the basic side. This may be carried out in a number of ways some of which are:

Alkali treatment of feed before distillation.
Alkali treatment of feed before and during distillation.
Alkali added to feed to distillation column.
Alkali added to feed and to reflux.
Alkali added to upper point in distillation tower, etc.

The aldol condensation product obtained by the distillation of the aldehyde containing fraction in the presence of alkali may be recovered by steam or vacuum distillation and submitted, if desired, to various conversion operations, for example:

Mixed glycols are prepared by hydrogenating the aldol product. Hydrogenation of an aldol product obtained by alkali treatment of a 42–82° C. boiling point fraction of a synthesis water layer produced a mixture of 1,3-glycols containing from 6 to 10 carbon atoms. The aldols have the general structure of 2-alkyl-3-hydroxyaldehydes. Under hydrogenation conditions these compounds are converted to highly branched mixed glycols of the type:

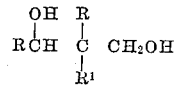

which compounds exhibit modified solubility, viscosity, etc.

The aldol condensation product may be dehydrated by the use of heat, acid, acid anhydrides, etc., to form alpha-beta unsaturated aldehydes which on hydrogenation yield a mixture of primary alcohols. Aldol condensation products obtained from a 42–48° C. boiling point fraction of the synthesis water layer on such treatment as described, yield a mixture of primary alcohols containing from 6 to 10 carbon atoms. Dialkyl primary alcohols would result from the application of this procedure to the aldol condensation products of branched aldehydes such as isovaleraldehyde. A neopentyl-type alcohol or glycol can be obtained from the aldol condensation product of isobutyraldehyde. Under alkali treatment the isobutyraldehyde would be converted to 2,2,4-trimethyl-3-hydroxy-1-pentanol. Hydrogenation of these compounds would yield the glycol 2,2,4-trimethyl-1,3-pentanediol which contains a neopentyl type skeleton. Dehydration of the 2,2,4-trimethyl-3-hydroxy-1-pentanol followed by hydrogenation would yield the neopentyl-type alcohol 2,2,4-trimethyl-1-pentanol.

Having described the invention in a manner so that it may be practiced by those skilled in the art, what is claimed is:

1. The method of separating alcohol with ketone components from a wide-boiling aqueous mixture of substantially water-soluble $C_1$-$C_5$ aliphatic oxygenated compounds comprising alcohol, aldehyde and ketone components which boil in aqueous solutions at temperatures in the range of 15° C. to 100° C., said components being difficult to separate by ordinary fractional distillation due to the tendency of the aldehyde and ketone components to form azeotropes and to react with an alcohol component to form acetals and ketals which consists in introducing the aqueous mixture into a fractional distillation zone, maintaining in the fractional distillation zone a pH of 7.1 to 11, distilling the alcohol and ketone components with azeotropic amounts of water overhead from said zone in which fractional condensate reflux is formed at boiling temperatures of 68° C. to 100° C. while simultaneously converting the aldehyde components to aldolization products and suppressing formation of acetals and ketals, and recovering from the distillation zone an overhead distillate containing ketone and alcohol components free of acetals and ketals and substantially lowered amounts of aldehyde.

2. The method of claim 1 in which the pH is maintained by the addition of an alkali to the mixture being distilled.

3. The method according to claim 1 in which the mixture of oxygenated compounds submitted to distillation has a boiling range of approximately 69° C.–81° C. when distilled from an aqueous solution.

4. The method according to claim 1 in which the mixture of oxygenated compounds submitted to distillation has a boiling range of approximately 81–90° C. when distilled from an aqueous solution.

5. The method according to claim 1 in which the mixture of oxygenated compounds submitted to distillation has a boiling range of approximately 90–95° C. when distilled from an aqueous solution.

CARL S. CARLSON.
PAUL V. SMITH, Jr.

REFERENCES CITED

The following references are of record in the file of this patent:

UNITED STATES PATENTS

| Number | Name | Date |
| --- | --- | --- |
| Re. 21,727 | Rodenburg | Feb. 25, 1941 |
| 2,080,111 | Bump | May 11, 1937 |
| 2,139,179 | Tulleners | Dec. 6, 1938 |
| 2,238,016 | Downey | Apr. 8, 1941 |
| 2,302,346 | Pohler | Nov. 17, 1942 |
| 2,442,280 | Alheritiere | May 25, 1948 |
| 2,485,329 | Steele et al. | Oct. 18, 1949 |
| 2,533,754 | Ballard | Dec. 12, 1950 |
| 2,544,308 | Friedman et al. | Mar. 6, 1951 |

FOREIGN PATENTS

| Number | Country | Date |
| --- | --- | --- |
| 350,502 | Great Britain | June 15, 1931 |